US006591930B2

(12) United States Patent
Coughlin et al.

(10) Patent No.: US 6,591,930 B2

(45) Date of Patent: Jul. 15, 2003

(54) VALVE COVER

(75) Inventors: Jeffrey P. Coughlin, Pewaukee, WI (US); Brent Lincoln Reid Thompson, Franklin, WI (US); Brian Scott Kennedy, Oak Creek, WI (US); Andreas Schneider, Leonberg (DE); Klaus Fuoss, Balingen (DE)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 0 days.

(21) Appl. No.: 09/900,692

(22) Filed: Jul. 6, 2001

(65) Prior Publication Data

US 2002/0003056 A1 Jan. 10, 2002

(30) Foreign Application Priority Data

Jul. 8, 2000 (DE) ........................................ 100 33 367

(51) Int. Cl.$^{7}$ ................................................ F01M 9/10

(52) U.S. Cl. .................................... 180/219; 123/90.38

(58) Field of Search ....................... 180/219; 123/90.38, 123/195 C, 198 E

(56) References Cited

U.S. PATENT DOCUMENTS 4,495,903 A * 1/1985 Asano ..................... 123/90.38
4,497,293 A * 2/1985 Takagi et al. ........... 123/196 A
4,519,471 A 5/1985 Miyakoshi et al.
4,550,698 A 11/1985 Konneker
4,721,075 A 1/1988 Kasai
4,788,950 A * 12/1988 Finley ........................ 123/195
5,058,542 A 10/1991 Grayson et al.
5,095,860 A * 3/1992 Newell .................... 123/90.38
5,297,506 A 3/1994 Reckzugel et al.
5,339,778 A 8/1994 Reckzugel et al.
5,474,035 A * 12/1995 Ming et al. .............. 123/41.86
5,560,331 A 10/1996 Komatsu
5,931,131 A 8/1999 Hackett
5,988,125 A 11/1999 Hara et al.
6,098,583 A * 8/2000 Gordon ................... 123/90.38
6,296,073 B1 * 10/2001 Rioux et al. ................ 180/292

FOREIGN PATENT DOCUMENTS

DE 2314793 9/1975
DE 2746669 C3 5/1986
DE 4029710 C2 1/1998
EP 0742351 A1 11/1996
GB 1315128 4/1973

OTHER PUBLICATIONS

Pending patent application Ser. No. 09/112,619 entitled "Motorcycle Rocker Assembly".

* cited by examiner

*Primary Examiner*—Lesley D. Morris
*Assistant Examiner*—Tony Winner
(74) *Attorney, Agent, or Firm*—Michael Best & Friedrich LLP

(57) ABSTRACT

A motorcycle engine capable of being supported within a frame. The engine includes a cylinder head having an upper peripheral edge and a valve cover having an assembled width and a lower peripheral edge substantially corresponding in shape to the upper peripheral edge of the cylinder head. The valve cover includes first and second portions coupled together along an engagement surface that does not extend across the entire assembled width of the valve cover. The second portion is separable from the first portion along the engagement surface to facilitate removal of the first portion from the engine. In one aspect of the invention, the first and second portions are separate castings.

26 Claims, 5 Drawing Sheets

VALVE COVER

FIELD OF THE INVENTION

The invention relates to motorcycles, and more particularly to motorcycles having overhead valve or overhead cam engines.

BACKGROUND OF THE INVENTION

The use of overhead valve and overhead cam engines is well-known in the motorcycle industry. These engines have several distinguishing features, one of which is a valve cover mounted on the cylinder head. The valve cover defines the upper portion of either the rocker box (for overhead valve engines) or the cam case (for overhead cam engines).

The valve cover is typically a one-piece casting that has a lower peripheral edge corresponding in shape to the upper peripheral edge of the cylinder head. The valve cover is mounted on the cylinder head over the valve drive (e.g., rockers and valves or cams and valves). A sealing gasket is commonly used to seal the joint between the cylinder head and the valve cover.

The assembled engine is supported by the frame of the motorcycle. Since access to the valves is needed for valve drive adjustment, maintenance, and repair during the life of the motorcycle, it is desirable to design the frame such that the valve cover can be removed from the cylinder head when the engine is mounted to the frame. The frame must offer enough clearance for the valve cover to be lifted and removed from the cylinder head without catching on the valve drive components. Typically, this requires a significant gap between the valve cover and the frame.

SUMMARY OF THE INVENTION

The valve cover of the present invention is designed to minimize the clearance needed to remove the valve cover from the cylinder head. By reducing the necessary clearance between the valve cover and the frame, the size of the gap between the valve cover and the frame can be reduced. This reduction facilitates a more compact motorcycle design.

More specifically, the invention provides a motorcycle engine capable of being supported within a frame. The engine includes a cylinder head having an upper peripheral edge and a valve cover having an assembled width and a lower peripheral edge substantially corresponding in shape to the upper peripheral edge of the cylinder head. The valve cover includes first and second portions coupled together along an engagement surface that does not extend across the entire assembled width of the valve cover. The second portion is separable from the first portion along the engagement surface to facilitate removal of the first portion from the engine. In one aspect of the invention, the first and second portions are separate castings.

The invention also provides a method of assembling a valve cover for a motorcycle engine. The engine is supported in a frame defining a first side and a second side, and the engine includes a cylinder head having an upper peripheral edge spaced from a portion of the frame. The method includes inserting a first portion of a valve cover having an assembled width from the first side, into a space between the upper peripheral edge and the frame, and at a first angular orientation with respect to the frame and the cylinder head, changing the angular orientation of the first portion with respect to the frame and the cylinder head by tilting at least part of the first portion toward the cylinder head, engaging the first portion with the upper peripheral edge of the cylinder head, inserting a second portion of the valve cover from the second side into the space between the upper peripheral edge and the frame, and engaging the second portion of the valve cover with the first portion of the valve cover along an engagement surface that does not extend across the entire assembled width. In one aspect of the invention, the method further includes positioning a sealing gasket between the upper peripheral edge and the first portion.

Other features and advantages of the invention will become apparent to those skilled in the art upon review of the following detailed description, claims, and drawings.

BRIEF DESCRIPTION OF THE DRAWINGS

FIG. 2 is an enlarged side view illustrating the engine of FIG. 1 with portions of the valve covers disassembled.

Figure 1:
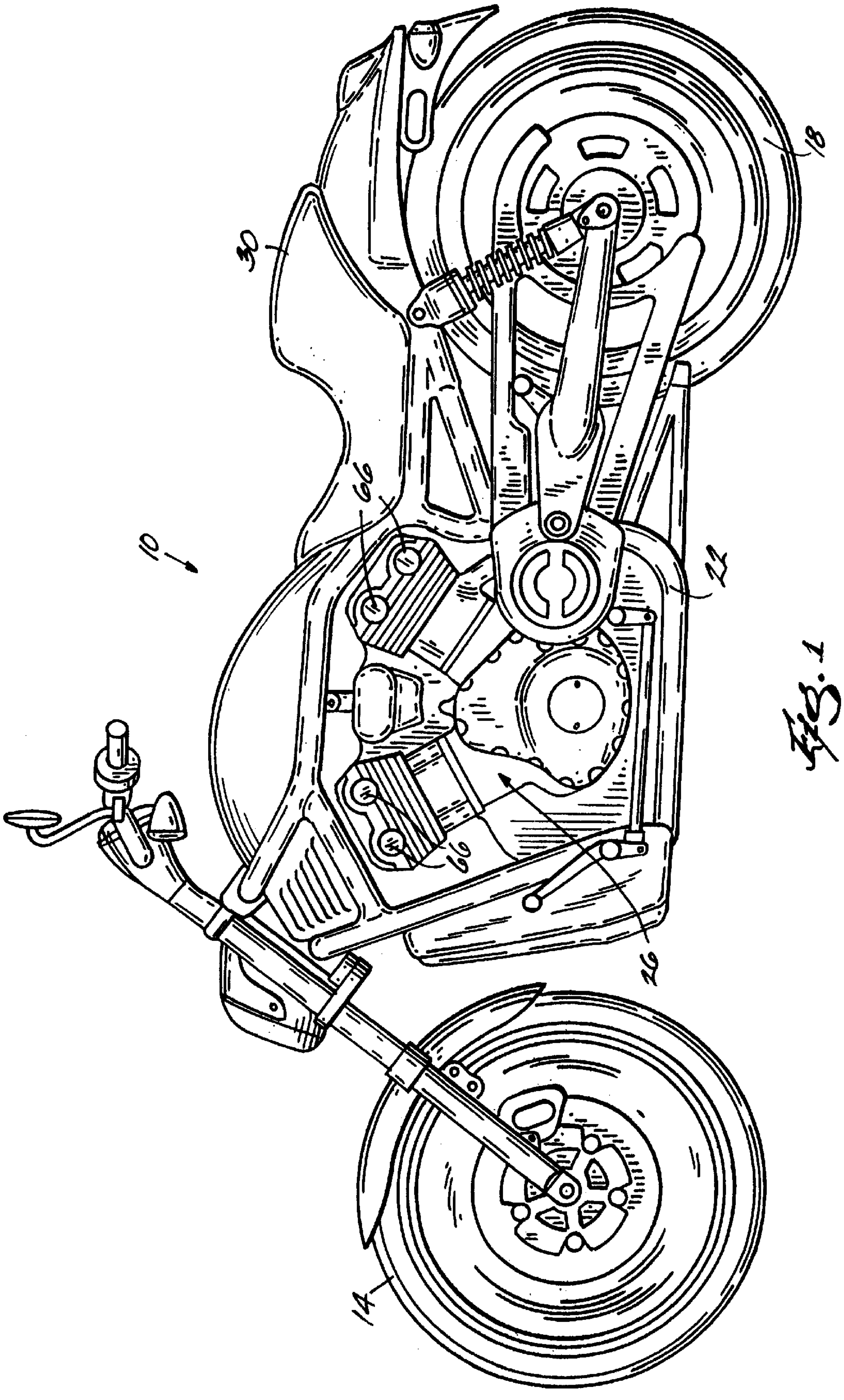
FIG. 1 is a side view of a motorcycle having an engine embodying the invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 3:
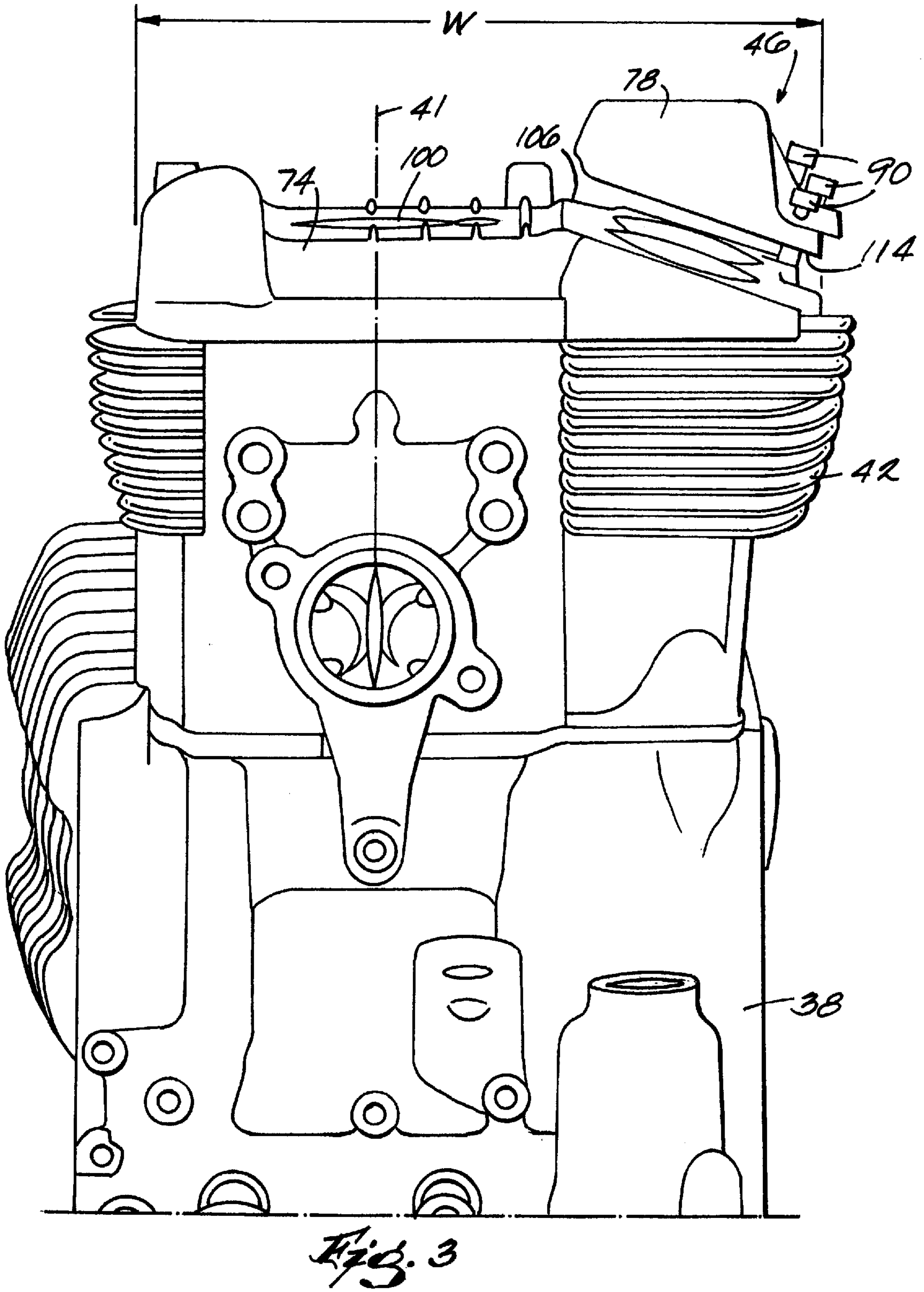
FIG. 3 is a front view illustrating the engine of FIG. 1 with a portion of the valve cover disassembled.
Figure 4:
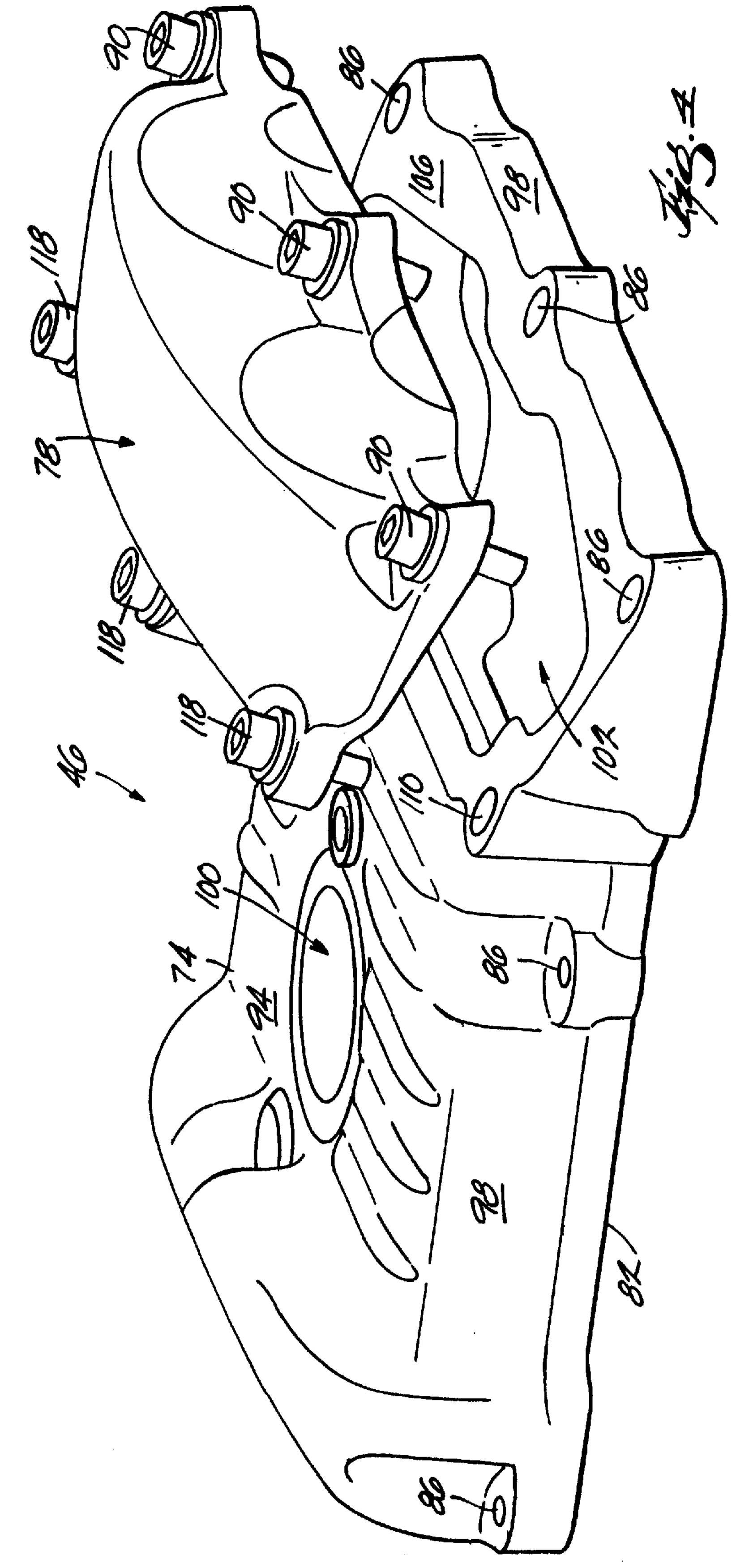

FIG. 1 illustrates a motorcycle 10 embodying the present invention. The motorcycle 10 includes a front wheel 14, a rear wheel 18, a frame 22 supported by the wheels 14 and 18, an engine 26 supported by the frame 22, and a seat 30. As shown in FIGS. 2–3, the engine 26 includes a crank case 38 and a pair of substantially identical cylinders 40 and cylinder heads 42 mounted in a V-configuration on separate locations on the crank case 38. Each of the cylinders 40 defines a longitudinal axis 41 (i.e., the longitudinal axis of the bore in the cylinder). A valve cover 46 is mounted on top of each cylinder head 42. The two illustrated valve covers 46 are substantially identical.

Figure 5:
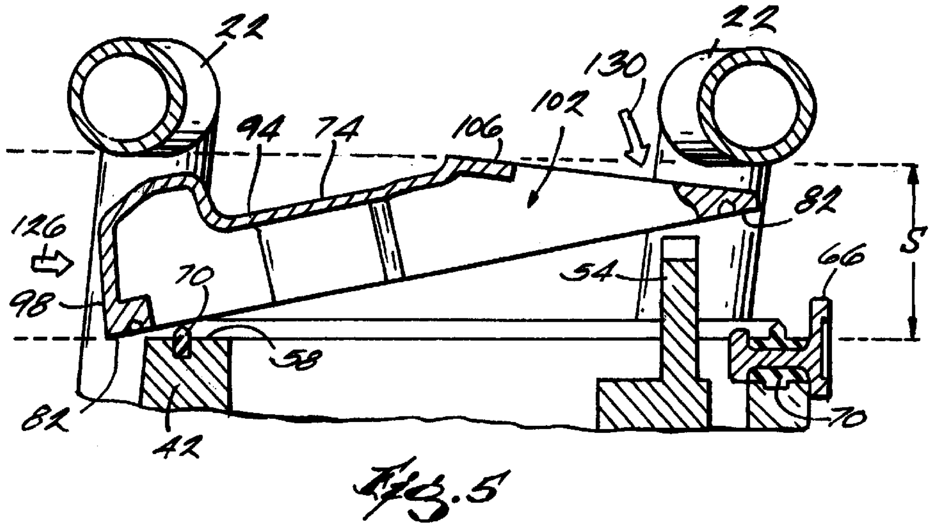
FIGS. 5–7 are section views taken along line 5—5 in FIG. 2, and illustrate the installation and assembly of the valve cover of FIG. 1, with certain internal components not shown for clarity.
Figure 6:
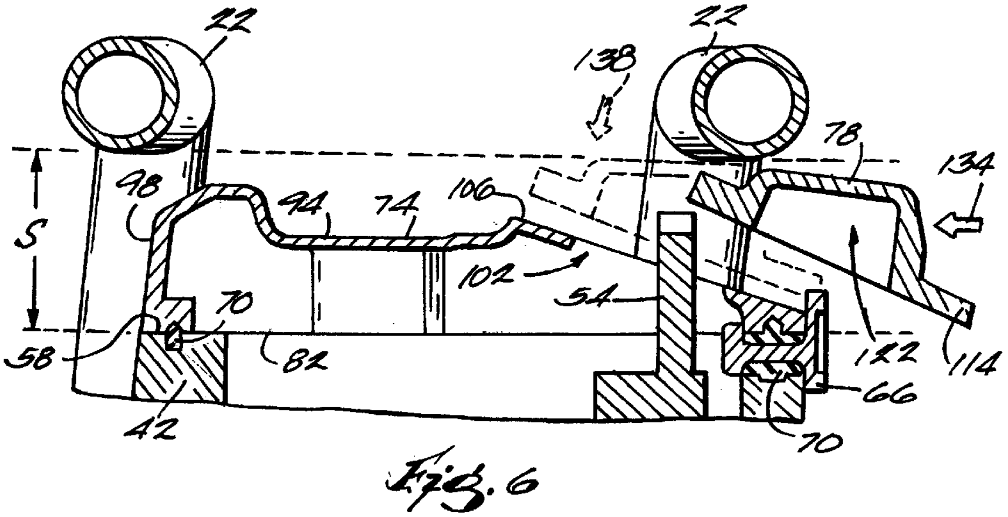
Figure 7:
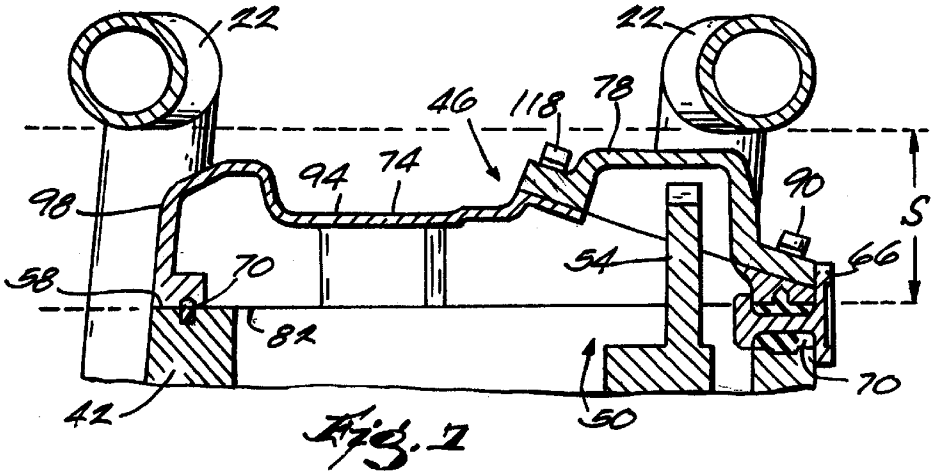

In the illustrated embodiment, the engine 26 is an overhead cam engine. Together, each cylinder head 42 and valve cover 46 defines a cam case 50 (see FIG. 7) that houses a valve drive assembly, which includes spring-loaded intake and exhaust valves (not shown), intake and exhaust cam shafts (not shown), actuating cams mounted on each of the cam shafts (not shown), and a drive gear 54 mounted on each of the cam shafts (only one is shown in FIGS. 5–7). Of course, the engine could alternatively be an overhead valve engine, wherein together the valve cover 46 and cylinder head would define a rocker box.

As shown in FIGS. 5–7, the cylinder head 42 is closely spaced S from the frame 22. Each cylinder head 42 includes an upper peripheral edge 58 on which the valve covers 46 are removably mounted. The upper peripheral edge 58 lies substantially in a single plane, with the exception of two semi-circular recesses 62 (see FIG. 2) that are formed in the sidewall of the cylinder head 42 to facilitate the reaming of the cam shaft bearing seats (not shown). These recesses 62 are closed using cam end cover inserts 66 (see FIGS. 1 and 5–7) that are inserted into the recesses 62. Preferably, the cam end cover inserts 66 are retained in a sealing gasket 70 (see FIGS. 5–7) that is positioned on the upper peripheral edge 58 of the cylinder head 42. The sealing gasket substantially seals the cam case 50 between the cylinder head 42 and the valve cover 46. With the cam end cover inserts 66 positioned in the recesses 62, the upper peripheral edge 58, the cam end cover inserts 66, and the sealing gasket 70 together form a substantially planar mounting surface for the valve cover 46. It should be understood that the interface between the valve cover 46 and the cylinder head 42 need not be substantially planar to achieve the benefits of the present invention.

Figure 4:
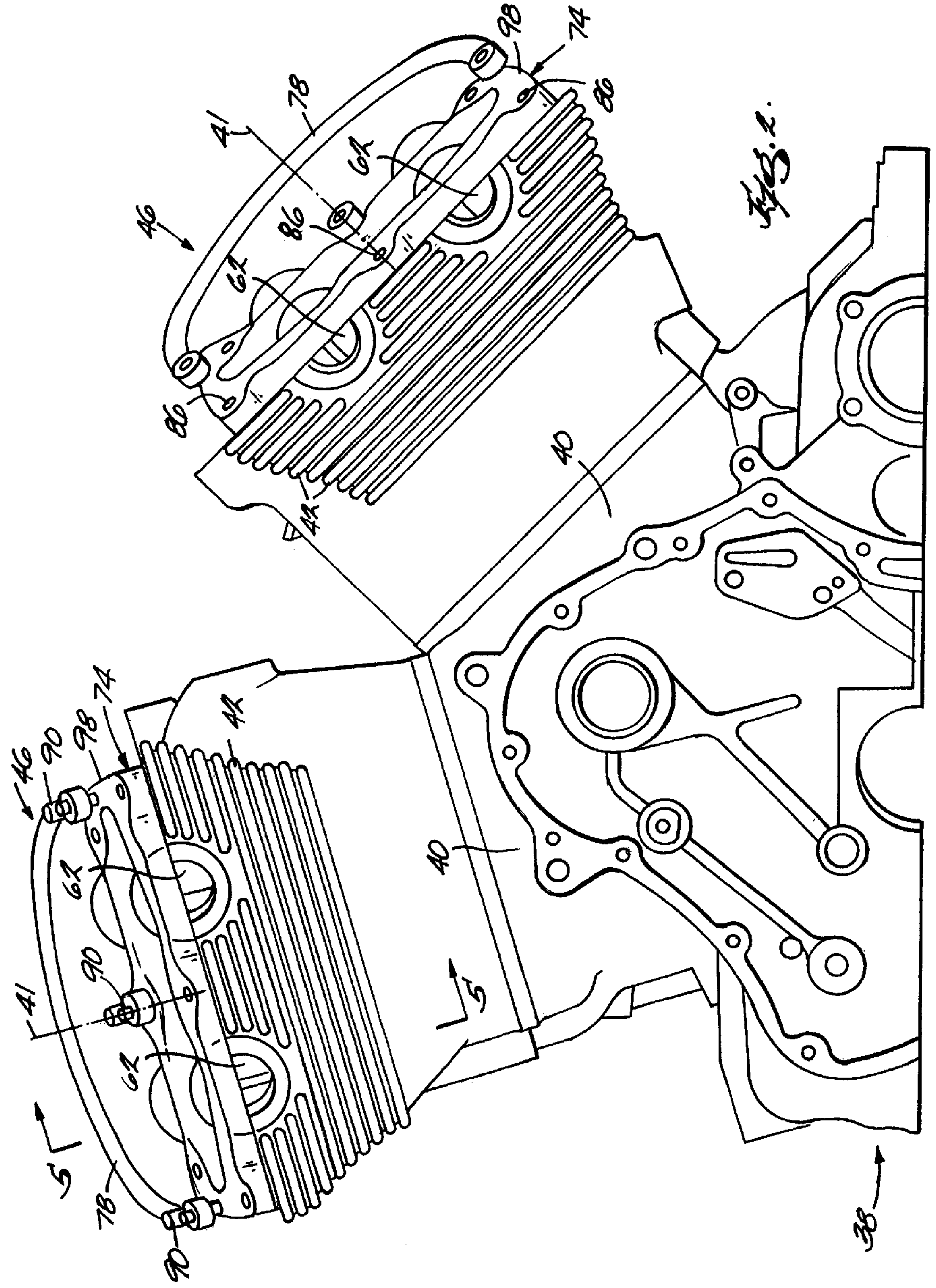
FIG. 4 is an enlarged, exploded perspective view of the valve cover shown in FIG. 2.

To facilitate mounting the valve cover 46 on the cylinder head 42 while the engine 26 is supported in the frame 22, the valve cover 46 is constructed in two pieces. As best seen in FIG. 4, the valve cover 46 includes a first portion in the form of a base 74 and a second portion in the form of a lid 78. The base 74 and the lid 78 are preferably separately-cast and machined metallic parts. The base 74 includes a lower peripheral mounting edge 82 substantially corresponding in shape to the upper peripheral edge 58 of the cylinder head 42. When assembled, the mounting edge 82 engages the upper peripheral edge 58 and the sealing gasket 70. Fastener holes 86 adjacent the mounting edge 82 receive mounting fasteners in the form of screws 90 (only three are shown) that couple the base 74 to the cylinder head 42. Of course, other types of fasteners can be used.

The base 74 further includes a top surface 94 and four side surfaces 98 extending between the top surface 94 and the lower peripheral mounting edge 82. The top surface 94 has therein a spark plug opening 100 (see FIG. 4) for receiving a spark plug (not shown). In addition, the top surface 94 includes a second opening 102 that is configured to be closed by the lid 78.

In the preferred embodiment, the second opening 102 is located adjacent three of the four side surfaces 98 to one side of the spark plug opening 100. The second opening 102 is defined by a mounting surface 106 that lies in a plane that is angled with respect to the remainder of the top surface 94 and with respect to the mounting edge 82. In the illustrated embodiment, the mounting surface 106 lies in a plane that is inclined approximately twenty to twenty-five degrees with respect to the lower peripheral mounting edge 82. As shown in the figures, the peripheral mounting edge 82 lies in a plane that is substantially normal to the longitudinal axis 41 of the cylinder 40. Of course, other suitable angles, preferably of at least fifteen degrees, can also be used. The mounting surface 106 includes three of the fastener holes 86, and further includes three additional fastener holes 110 used to secure the lid 78 to the base 74 as described below.

The second opening 102 facilitates the installation and removal of the valve cover 46 as shown in FIGS. 5 and 6. Specifically, the opening 102 and the angled mounting surface 106 allows the base 74 to be installed on the cylinder head 42 without substantial interference from the frame 22 or the drive gears 54, and without the need to remove the engine from the frame. The method of installation will be described in greater detail below.

The lid 78 includes a mounting surface 114 (see FIG. 6) that is also inclined with respect to the lower mounting edge 82 and that is configured to engage the mounting surface 106 of the base 74, thereby allowing the lid 78 to be coupled to the base 74 along an engagement surface defined by the mounting surfaces 106 and 114. Together, the base 74 and lid 78 have an assembled width W (see FIG. 3), and the engagement surface defined by the mounting surfaces 106 and 114 does not extend across the entire assembled width W. The three screws 90, plus three additional screws 118, fasten the lid 78 to the base 74 via the fastener holes 86 and 110, respectively. Of course, the number of screws 90 and 118 is not critical.

The lid 78 defines an inner cavity 122 (see FIG. 6) that receives and houses a portion of the drive gears 54 when the lid 78 is assembled on the base 74. The inner cavity 122 and the angled mounting surface 114 allows the lid 78 to be installed on the base 74 without substantial interference from the frame 22 or the drive gears 54.

The method of installing the valve cover 46 on the cylinder head 42 will now be described. First, the sealing gasket 70 and the cam end cover inserts 66 are positioned on the upper peripheral edge 58 of the cylinder head 42. Referring to FIG. 5, the base 74 is then inserted through the space S from one side of the frame 22 in the direction of the arrow 126 until the opening 102 is positioned above the drive gears 54. To accomplish this, the base 74 must be oriented in a first angular orientation with respect to the frame 22 and the cylinder head 42. This allows portions of the mounting edge 82 adjacent to the opening 102 to pass over the drive gears 54 and below the frame 22. The base 74 can then be tilted in the direction of the arrow 130 to a second angular orientation (see FIG. 6) with respect to the frame 22 and the cylinder head 42, wherein the mounting edge 82 is aligned with and engages the upper peripheral edge 58 of the cylinder head 42 and the sealing gasket 70.

As seen in FIG. 6, when the base 74 is in the second angular orientation, the drive gears 54 extend through the opening 102 toward the frame 22. The base 74 can then be partially secured to the upper peripheral edge 58 of the cylinder head 42 by fastening some of the screws 90 (see FIG. 7) into the fastener holes 86 that are not directly adjacent the opening 102.

Next, the lid 78 is inserted through the space S into position between the frame 22 and the base 74 from the opposite side of the frame 22 and in the direction of the arrow 134. To accomplish this, the lid 78 may need to be tilted slightly to allow portions of the mounting surface 114 to pass over the drive gears 54. Once the drive gears 54 are within the inner cavity 122, and the mounting surface 114 of the lid 78 is aligned with the mounting surface 106 of the base 74 (as shown in phantom in FIG. 6), the lid 78 can be brought into engagement with the base 74 in the direction of the arrow 138 to the position shown in FIG. 7. Next, the screws 118 can be inserted into the fastener holes 110 and the remaining screws 90 can be inserted into the remaining fastener holes 86. FIG. 7 shows the installed valve cover 46. Dismantling the valve cover 46 occurs in substantially the reverse order as described above and shown in FIGS. 5–7.

The two-piece design of the valve cover 46 greatly facilitates the installation of the valve cover 46. Furthermore, the two-piece valve cover 46 enables a reduction in the size of the space S between the frame 22 and the cylinder head 42, resulting in a more compact motorcycle design.

Dismantling the valve cover 46 to obtain access to the valve drive is also greatly facilitated. Specifically, access to the valve drive can be obtained by removing only the lid 78, without the need for removing the base 74. By leaving the base 74 intact, the sealing gasket 70 and the resulting seal between the cylinder head 42 and the base 74 need not be disturbed. Additionally, because the engagement surface defined by the mounting surfaces 106 and 114 does not extend across the entire assembled width W of the valve cover 46, the lid 78 can be removed as a result of working from only one side of the motorcycle 10.

As mentioned above, the valve cover 46 could also be used with an overhead valve engine instead of with an overhead cam engine as shown and described above. If this were the case, the valve drive for the overhead cam engine would be replaced with a valve drive incorporating a rocker assembly. The specific configuration of the valve cover 46 may require some modifications to accommodate the different valve drive, however, such modifications are within the scope of the present invention.

Various features of the invention are set forth in the following claims.

What is claimed is:

1. A motorcycle comprising:

two wheels;

a frame supported by the two wheels, the frame including an upper portion; and an engine supported by the frame and positioned beneath the upper portion of the frame, the engine including a cylinder head having an upper peripheral edge, the upper peripheral edge separated from the upper portion to define a space;

valves supported by the cylinder head;

valve drive components supported by the cylinder head and at least partially extending above the upper peripheral edge, and a valve cover connected to the upper peripheral edge, the valve cover including first and second portions coupled together along an engagement surface, the valve drive components resisting the removal of the valve cover from the motorcycle through the space when the first and second portions are coupled together, the second portion being separable from the first portion along the engagement surface to facilitate removal of the first and second portions from the motorcycle through the space by avoiding interference with the valve drive components.

2. The motorcycle of claim 1, wherein the first portion of the valve cover is removably mounted to the upper peripheral edge.

3. The motorcycle of claim 2, wherein the second portion is removably mountable on the first portion when the first portion is mounted on the upper peripheral edge of the cylinder head.

4. The motorcycle of claim 2, wherein the engine further includes a cylinder defining a longitudinal axis, and wherein the engagement surface is inclined at least 15 degrees with respect to a plane substantially normal to the longitudinal axis.

5. The motorcycle of claim 1, wherein the first portion and the second portion are separate castings.

6. The motorcycle of claim 1, wherein the valve cover includes fasteners and wherein the first and second portions are separable when the fasteners are removed.

7. The motorcycle of claim 1, wherein the valve drive components include a drive gear.

8. The motorcycle of claim 1, wherein the first portion includes a height, the space being approximately equal to the height.

9. A motorcycle engine capable of being supported within a frame, the engine comprising:

a cylinder defining a longitudinal axis;

a cylinder head having an upper peripheral edge; and a valve cover having an assembled width and having a lower peripheral edge, the valve cover including first and second portions coupled together along an engagement surface that does not extend across the entire assembled width of the valve cover, the second portion being separable from the first portion along the engagement surface to facilitate removal of the valve cover from within the frame, and wherein the engagement surface is inclined at least 15 degrees with respect to a plane substantially normal to the longitudinal axis.

10. The motorcycle engine of claim 9, wherein the first portion of the valve cover is removably mountable on the upper peripheral edge of the cylinder head.

11. The motorcycle engine of claim 10, wherein the second portion is removably mountable on the first portion when the first portion is mounted on the upper peripheral edge of the cylinder head.

12. The motorcycle engine of claim 9, wherein the first and second portions are separate castings.

13. The motorcycle engine of claim 9, wherein the valve cover includes fasteners and wherein the first and second portions are separable when the fasteners are removed.

14. A method of assembling a valve cover on a motorcycle engine, the engine being supported in a frame defining a first side and a second side, and the engine including a cylinder head having an upper peripheral edge spaced from a portion of the frame, the method comprising:

inserting a first portion of the valve cover having an assembled width from the first side, into a space between the upper peripheral edge and the frame, and at a first angular orientation with respect to the frame and the cylinder head;

changing the angular orientation of the first portion with respect to the frame and the cylinder head by tilting at least part of the first portion toward the cylinder head;

engaging the first portion with the upper peripheral edge of the cylinder head;

inserting a second portion of the valve cover from the second side into the space between the upper peripheral edge and the frame; and engaging the second portion of the valve cover with the first portion of the valve cover along an engagement surface that does not extend across the entire assembled width.

15. The method of claim 14, further including positioning a sealing gasket between the upper peripheral edge and the first portion.

16. The method of claim 14, wherein engaging the first portion with the upper peripheral edge includes fastening the first portion to the cylinder head with fasteners.

17. The method of claim 14, wherein engaging the second portion with the first portion includes fastening the second portion to the first portion with fasteners.

18. A method of removing a valve cover from a cylinder head of a motorcycle engine, the cylinder head being supported within a frame of a motorcycle defining a first side and a second side, the valve cover having an assembled width, a first portion, and a second portion, the method comprising:

disengaging the second portion from the first portion along an engagement surface that does not extend across the entire assembled width;

withdrawing the second portion from the second side of the frame;

tilting at least part of the first portion away from the cylinder head; and withdrawing the first portion from the first side of the frame.

19. The method of claim 18, wherein disengaging the second portion from the first portion includes removing a fastener from the second portion.

20. The method of claim 18, wherein disengaging the first portion from the cylinder head includes removing a fastener from the first portion.

21. The method of claim 18, wherein the engine further includes a cylinder defining a longitudinal axis and wherein tilting the first portion includes tilting the first portion from an orientation that is substantially normal to the longitudinal axis and maintaining the tilted orientation while withdrawing the first portion from the first side of the frame.

22. A method of assembling a valve cover to a motorcycle engine, the engine being supported on a frame, the frame including an upper portion above the engine, and the frame defining a first side and a second side, the engine including a cylinder head having an upper peripheral edge, valves supported by the cylinder head, valve drive by the cylinder head and at least partially extending above the upper peripheral edge the method comprising providing a valve cover including separable first and second portions;

defining a space between the upper peripheral edge and the upper portion;

resisting insertion of the valve cover through the space with the valve drive components when the first and second portions are coupled together;

separating the first and second portions from each other;

inserting the first portion through the space from the first side;

connecting the first portion to the upper peripheral edge of the cylinder head;

inserting the second portion through the space from the second side;

connecting the second portion to the first portion along an engagement surface.

23. The method of claim 22, further comprising resisting the removal of the valve cover from the motorcycle through the space with the valve drive components when the first and second portions are coupled together.

24. The method of claim 23, further comprising disconnecting the second portion from the first portion along the engagement surface, removing the second portion through the space from the second side.

25. The method of claim 24, exposing the valves after the second portion is removed, and adjusting the valves from the second side.

26. The method of claim 24, removing the first portion from the motorcycle through the space from the first side.

* * * * *

UNITED STATES PATENT AND TRADEMARK OFFICE

CERTIFICATE OF CORRECTION

PATENT NO. : 6,591,930 B2 
DATED : July 15, 2003
INVENTOR(S) : Jeffrey P. Coughlin et al.

It is certified that error appears in the above-identified patent and that said Letters Patent is hereby corrected as shown below:

Column 7,
Line 24, after "valve drive" insert -- components supported --.

Signed and Sealed this

Thirtieth Day of December, 2003

JAMES E. ROGAN
*Director of the United States Patent and Trademark Office*